United States Patent
Lee et al.

(10) Patent No.: US 10,935,805 B2
(45) Date of Patent: Mar. 2, 2021

(54) OPTICAL SENSOR AND METHOD FOR FORMING THE SAME

(71) Applicant: Vanguard International Semiconductor Corporation, Hsinchu (TW)

(72) Inventors: Hsin-Hui Lee, Kaohsiung (TW); Han-Liang Tseng, Hsinchu (TW); Jiunn-Liang Yu, Taipei (TW); Kwang-Ming Lin, Taichung (TW); Yin Chen, Hsinchu (TW); Si-Twan Chen, Jhubei (TW); Hsueh-Jung Lin, Jhubei (TW); Wen-Chih Lu, New Taipei (TW); Ting-Jung Lu, Taoyuan (TW)

(73) Assignee: VANGUARD INTERNATIONAL SEMICONDUCTOR CORPORATION, Hsinchu (TW)

( * ) Notice: Subject to any disclaimer, the term of this patent is extended or adjusted under 35 U.S.C. 154(b) by 289 days.

(21) Appl. No.: 16/264,005

(22) Filed: Jan. 31, 2019

(65) Prior Publication Data

US 2020/0249490 A1    Aug. 6, 2020

(51) Int. Cl.
*G02B 27/30* (2006.01)
*G02B 5/00* (2006.01)

(52) U.S. Cl.
CPC .............. *G02B 27/30* (2013.01); *G02B 5/003* (2013.01)

(58) Field of Classification Search
CPC ...... G02B 27/30; G02B 5/003; G02B 3/0056; G06K 9/00006

USPC .......................................................... 359/641
See application file for complete search history.

(56) References Cited

U.S. PATENT DOCUMENTS

| | | | |
|---|---|---|---|
| 10,699,092 B2* | 6/2020 | Tseng | G02B 27/30 |
| 2005/0127463 A1 | 6/2005 | Yaung et al. | |
| 2005/0286123 A1 | 12/2005 | Abu-Ageel | |
| 2012/0223214 A1 | 9/2012 | Lee et al. | |
| 2012/0313206 A1 | 12/2012 | Nozaki et al. | |
| 2020/0210669 A1* | 7/2020 | Lee | G06K 9/0004 |

OTHER PUBLICATIONS

Taiwanese Notice of Allowance and Search Report for Taiwanese Application No. 107132453, dated Mar. 25, 2019.

* cited by examiner

*Primary Examiner* — Mohammed A Hasan
(74) *Attorney, Agent, or Firm* — Birch, Stewart, Kolasch & Birch, LLP

(57) ABSTRACT

An optical sensor includes a plurality of pixels disposed in a substrate and a light collimating layer. The light collimating layer is disposed on the substrate. The light collimating layer includes a light-shielding layer, a plurality of transparent pillars, and a plurality of first dummy transparent pillars. The light-shielding layer is disposed on the substrate. The plurality of transparent pillars pass through the light-shielding layer and are disposed correspondingly on the plurality of pixels. The plurality of first dummy transparent pillars that pass through the light-shielding layer are disposed on a first peripheral region of the light collimating layer, wherein the plurality of first dummy transparent pillars surround the plurality of transparent pillars from a top view.

19 Claims, 10 Drawing Sheets

OPTICAL SENSOR AND METHOD FOR FORMING THE SAME

BACKGROUND

Technical Field

The disclosure relates to an optical element, and more particularly to an optical sensor and a method for forming the same.

Description of the Related Art

Optical elements in an optical sensor may include a light collimator, a beam splitter, a focusing lens, and a linear sensor, wherein the light collimator is utilized to ensure that light which is incident to the sensor is parallel, to reduce energy loss from divergent light. For example, the light collimator may be applied to an optical sensor to enhance the performance of a fingerprint sensor device.

The light collimator includes transparent pillars and a light-shielding layer surrounding the transparent pillars to collimate lights. However, during the process of manufacturing the light collimator, transparent pillars at the edge of the transparent pillar array may collapse easily and become deformed due to their cohesion force or the stress of the light-shielding layer, which can negatively affect the performance of the light collimator and thereby reduce the production yield of optical sensors.

While existing optical sensors have been generally adequate for their intended purposes, they have not been satisfactory in all respects. There is a particular need for further improvements in the structural strength of the light collimators used in optical sensors.

SUMMARY

In one embodiment of the present disclosure, an optical sensor is provided, wherein the optical sensor includes a plurality of pixels disposed in a substrate and a light collimating layer. The light collimating layer is disposed on the substrate. The light collimating layer includes a light-shielding layer, a plurality of transparent pillars, and a plurality of first dummy transparent pillars. The light-shielding layer is disposed on the substrate. The plurality of transparent pillars through the light-shielding layer are disposed correspondingly on the plurality of pixels. The plurality of first dummy transparent pillars through the light-shielding layer are disposed on a first peripheral region of the light collimating layer, wherein the plurality of first dummy transparent pillars surround the plurality of transparent pillars from a top view.

In another embodiment of the present disclosure, a method for forming an optical sensor is provided, wherein the method includes: forming a plurality of pixels in a substrate and forming a light collimating layer on the substrate. The steps for forming the light collimating layer comprise: forming a plurality of transparent pillars and a plurality of first dummy transparent pillars on the substrate, wherein the plurality of transparent pillars are disposed correspondingly on the plurality of pixels and the plurality of first dummy transparent pillars are disposed on a first peripheral region of the light collimating layer; and forming a light-shielding layer between the plurality of transparent pillars and the plurality of first dummy transparent pillars, wherein the plurality of first dummy transparent pillars surround the plurality of transparent pillars from a top view.

In order to make the purposes, features and advantages of the present disclosure easy to understand, a detailed description is given in the following embodiments with reference to the accompanying drawings.

BRIEF DESCRIPTION OF THE DRAWINGS

Aspects of this disclosure are best understood from the following detailed description when read with the accompanying figures. It should be noted that, in accordance with common practice in the industry, various features are not drawn to scale. In fact, the dimensions of the various features may be arbitrarily increased or reduced for clarity of discussion.

DETAILED DESCRIPTION

Figure 1A:
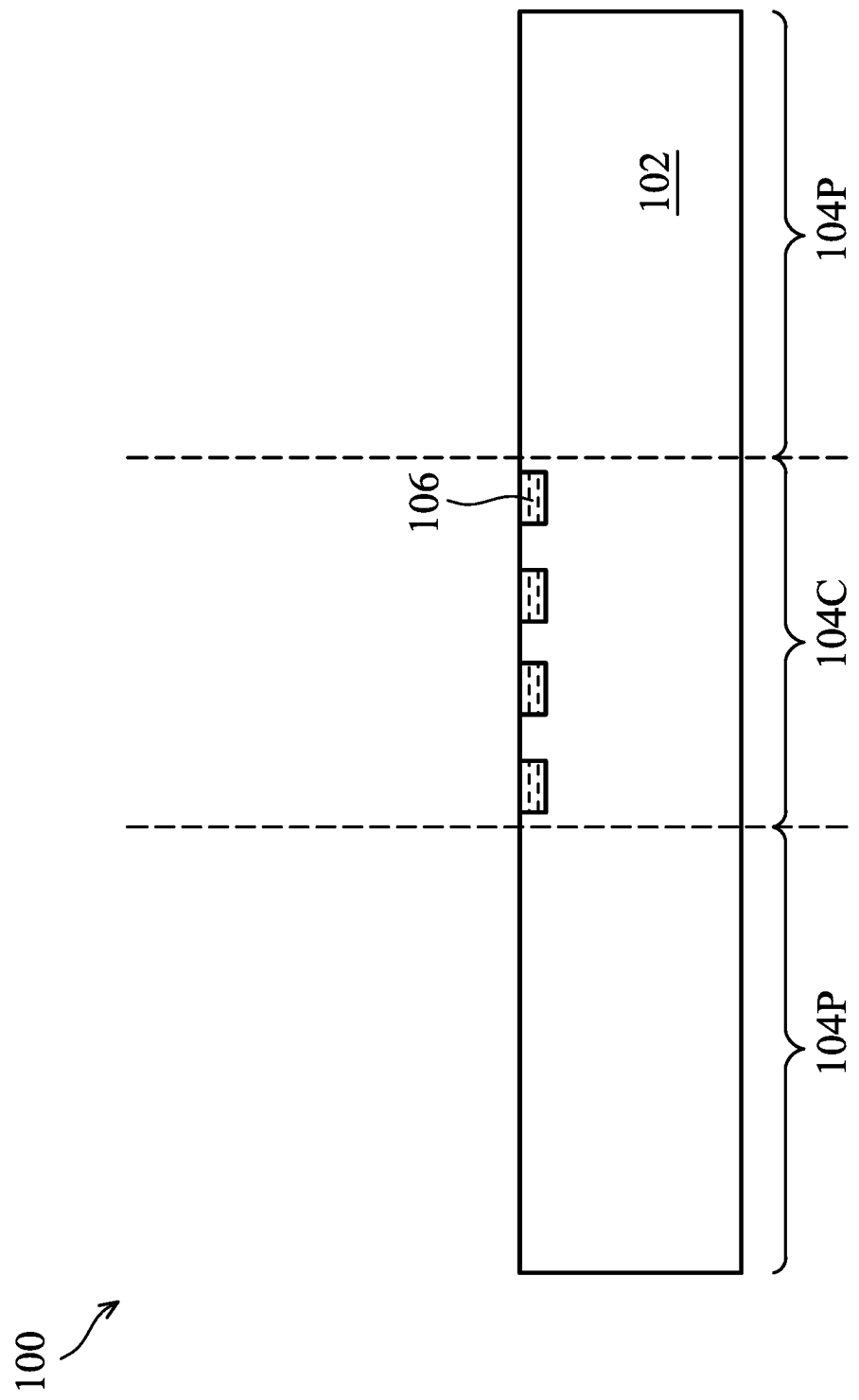
FIGS. 1A, 2A, and 3A are cross-sectional views illustrating various steps in forming an optical sensor, according to some embodiments of the present disclosure.

The following disclosure provides many different embodiments, or examples, for implementing different features of the subject matter provided. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "over", "below," "lower," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented and the spatially relative descriptors used herein may likewise be interpreted accordingly.

The terms "about", "approximately", and "substantially" used herein generally refer to the value of an error or a range within 20 percent, preferably within 10 percent, and more preferably within 5 percent, within 3 percent, within 2 percent, within 1 percent, or within 0.5 percent. If there is no specific description, the values mentioned are to be regarded as an approximation that is an error or range expressed as "about", "approximate", or "substantially".

Although some embodiments are discussed with operations performed in a particular order, these operations may be performed in another logical order. Some of the steps that are described can be replaced or eliminated for different embodiments. Additional operations can be provided before, during, and/or after the steps described in the embodiments of present disclosure. Additional features can be provided to the optical sensors in embodiments of the present disclosure. Some of the features described below can be replaced or eliminated for different embodiments.

The embodiments of the present disclosure provide an optical sensor. In the light collimating layer of the optical sensor, in addition to disposing the transparent pillar array on the corresponding pixel array, dummy transparent pillars are disposed at the perimeter of the transparent pillars. The dummy transparent pillars can strengthen the structure of the transparent pillar array to prevent the transparent pillars at the edge of the array from deformation and collapse. The uniformity of the transparent pillars can be enhanced and the production yield can be improved as a result.

Figure 1B:
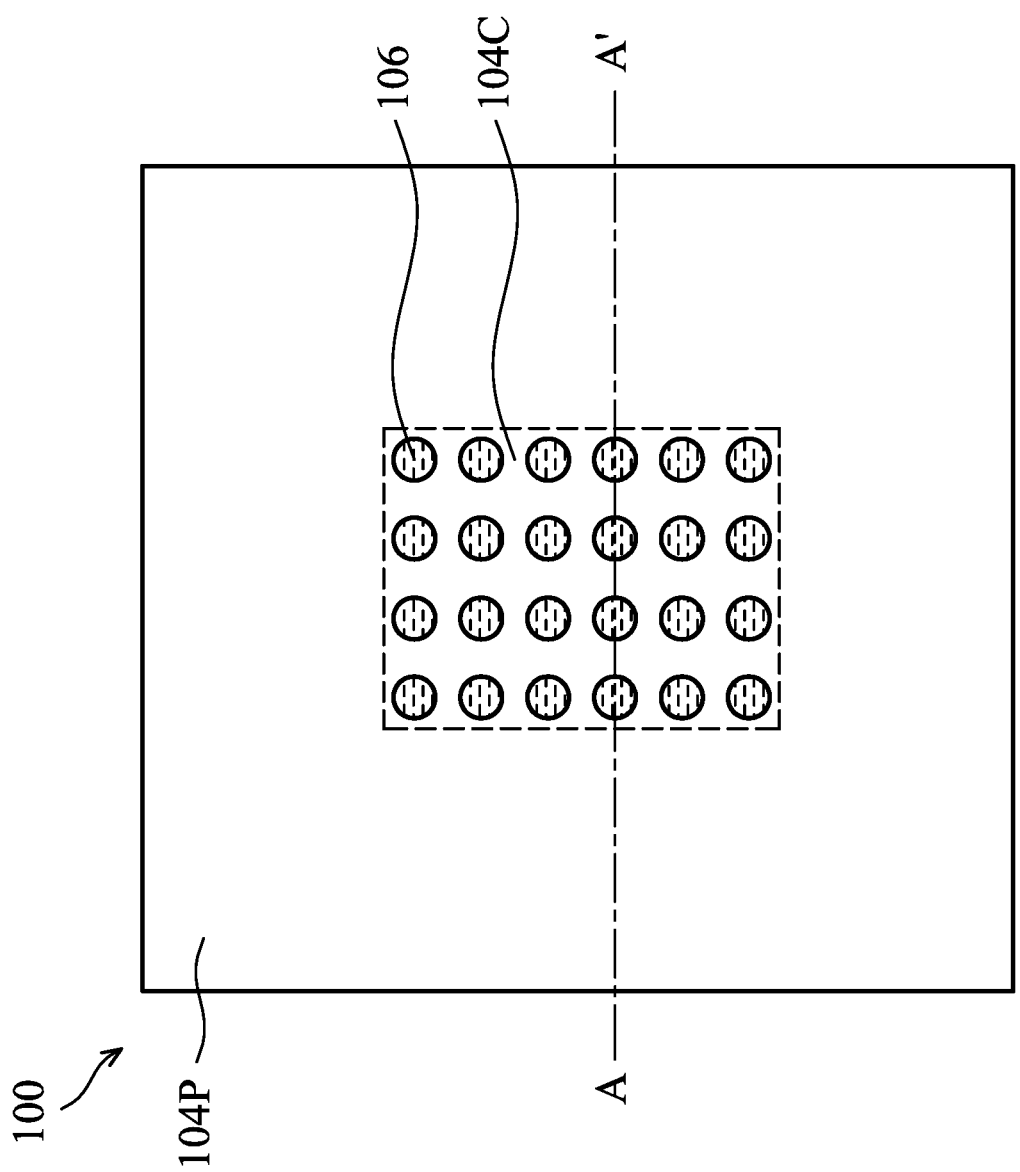
FIGS. 1B, 2B, and 3B are top views illustrating various steps in forming an optical sensor, according to some embodiments of the present disclosure.
Figure 2A:
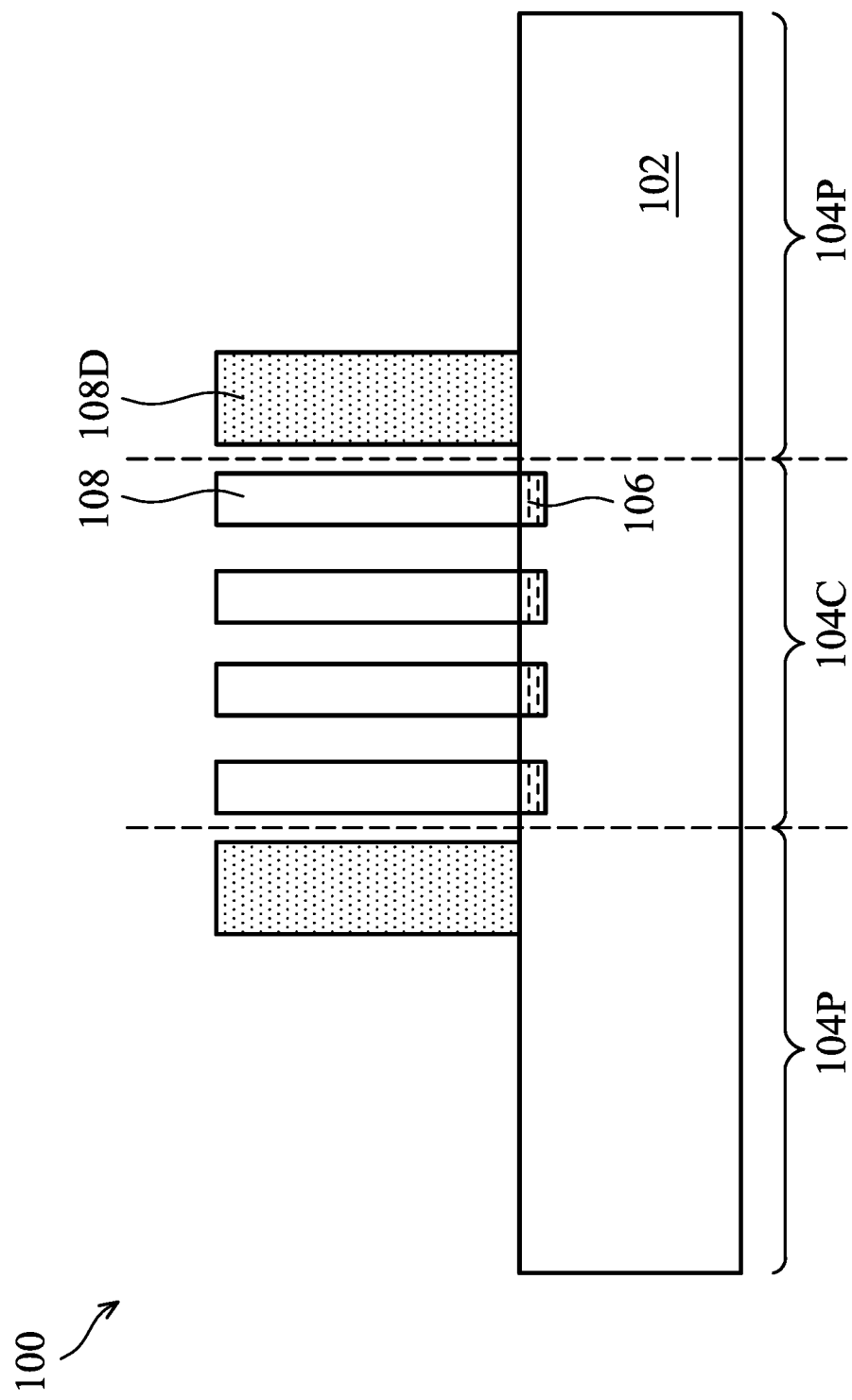
Figure 2B:
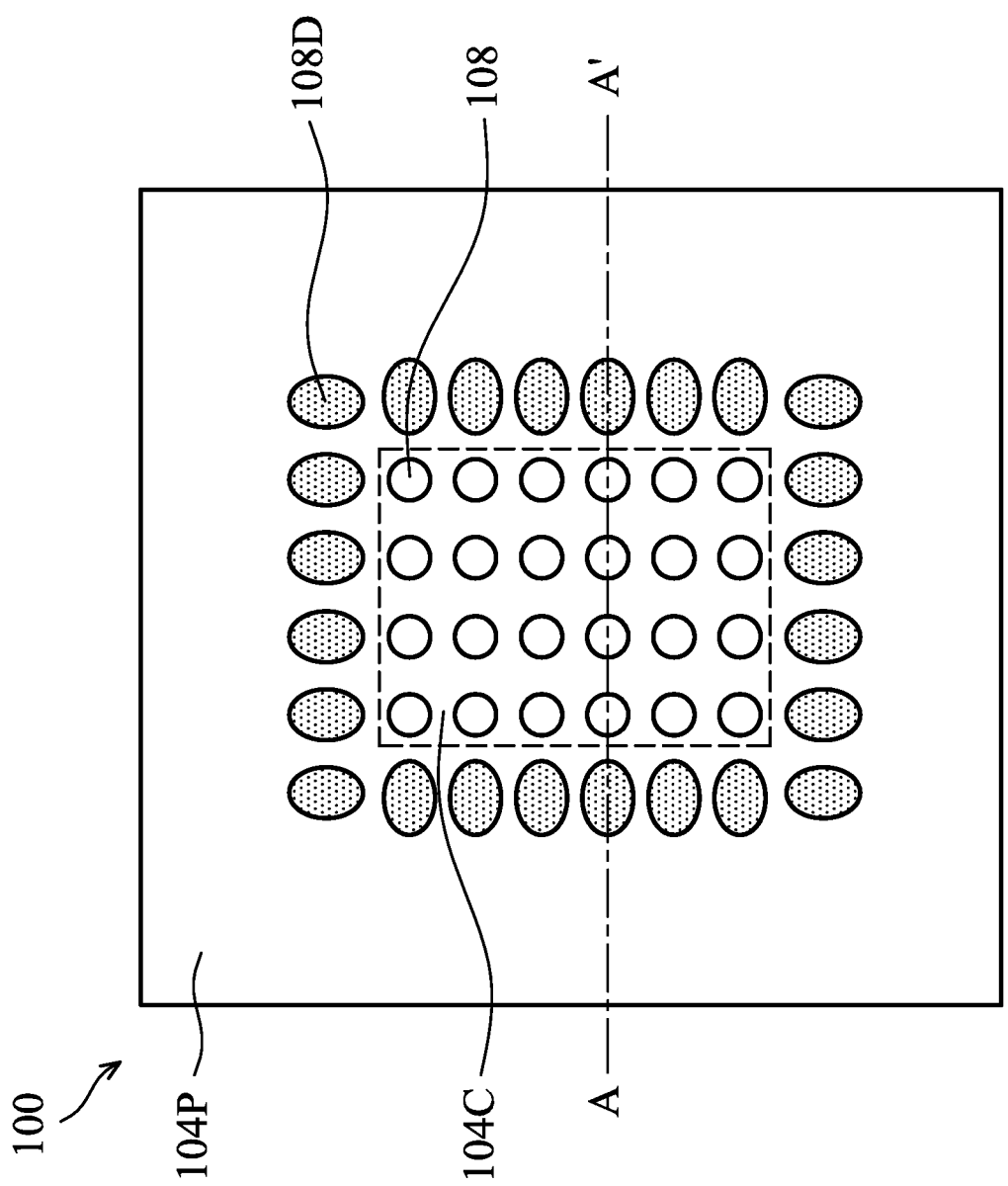
Figure 3A:
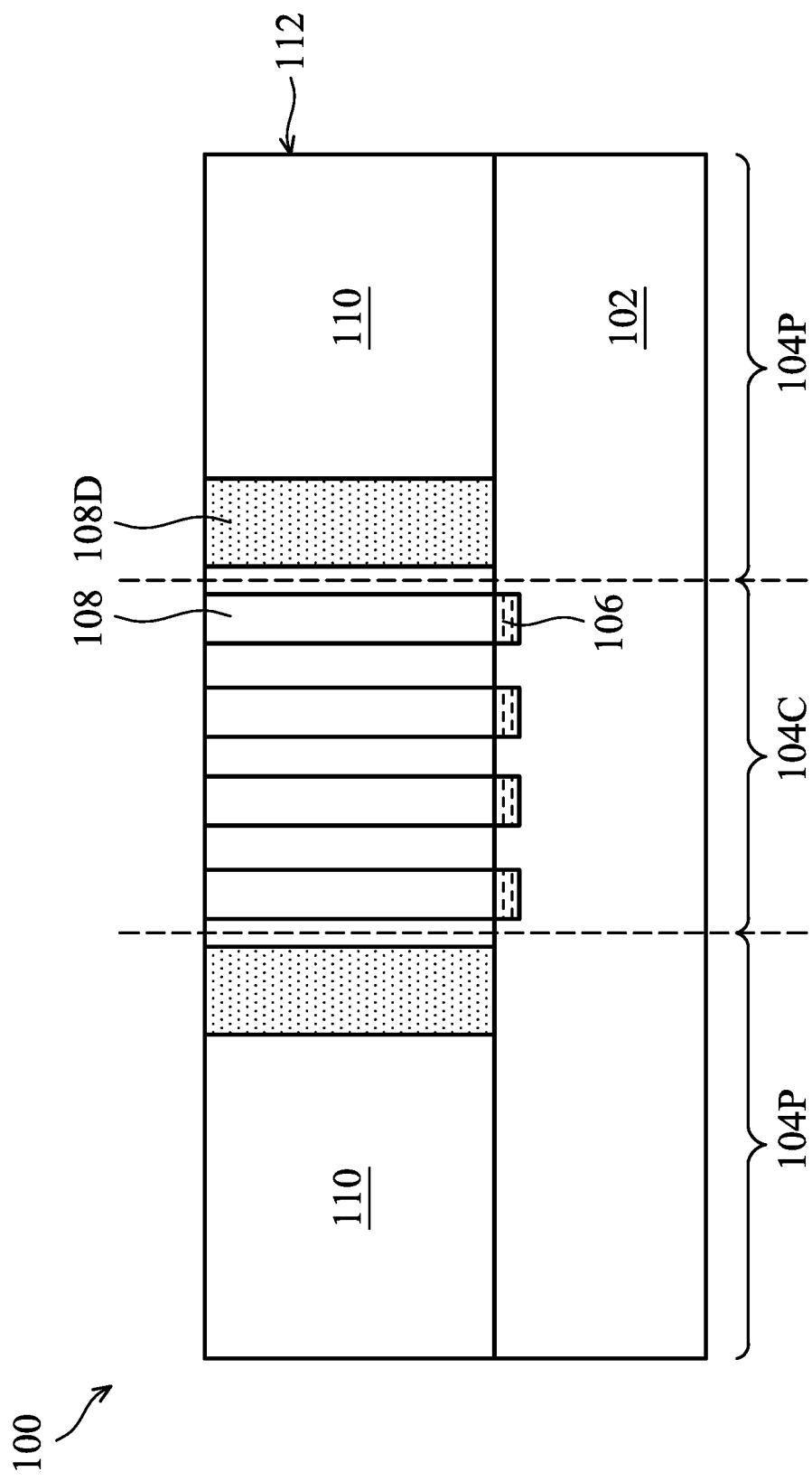
Figure 3B:
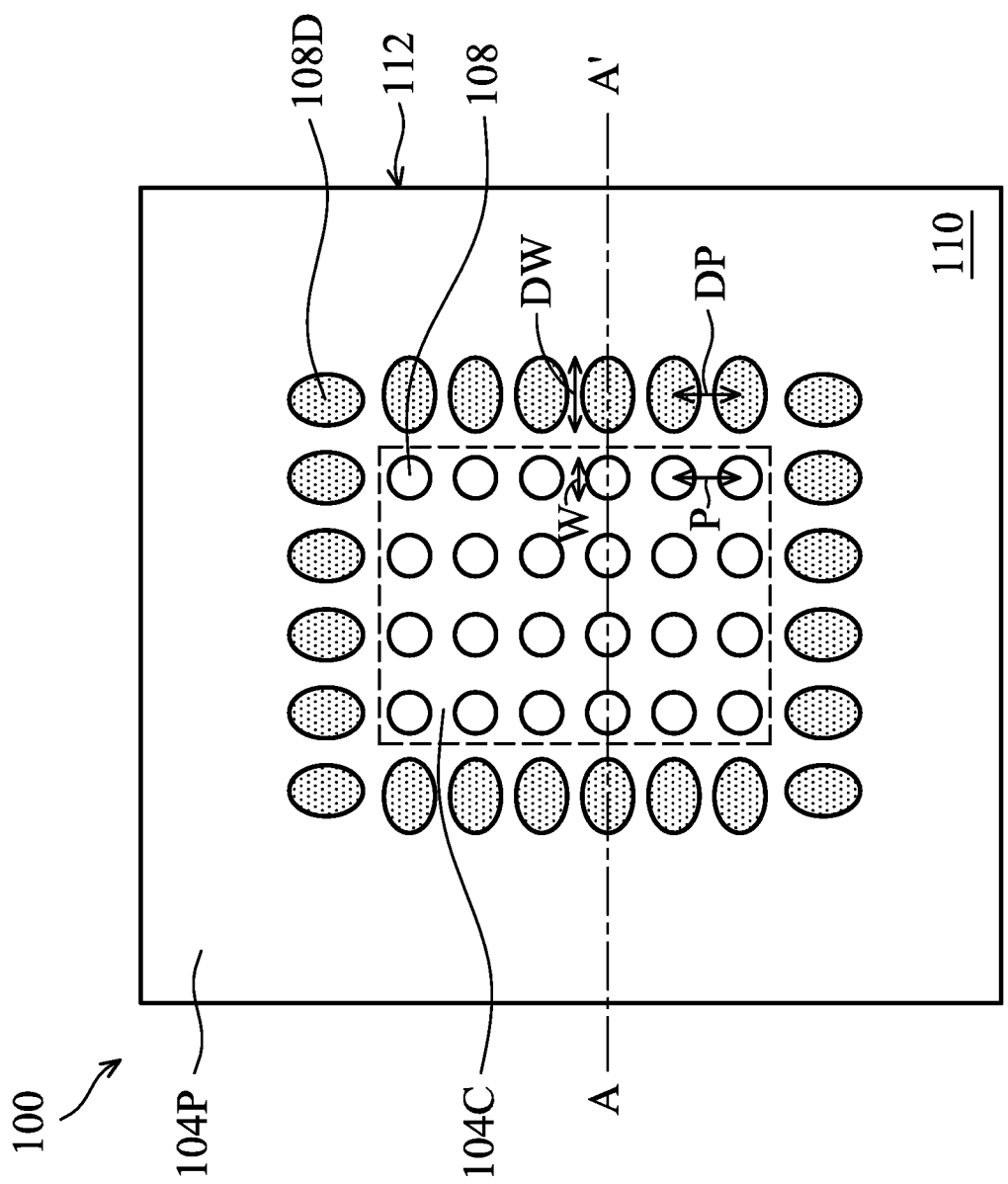

FIGS. 1A, 2A, and 3A are cross-sectional views illustrating various steps in forming an optical sensor 100, according to some embodiments of the present disclosure. FIGS. 1B, 2B, and 3B are top views illustrating various steps in forming an optical sensor, according to some embodiments of the present disclosure. FIGS. 1A, 2A, and 3A are cross-sectional views along the line segment A-A' in FIGS. 1B, 2B, and 3B.

As shown in FIGS. 1A and 1B, a substrate 102 is provided. The substrate 102 may be a semiconductor substrate, such as a silicon substrate. Furthermore, in some embodiments, the semiconductor substrate may be an elemental semiconductor including germanium, a compound semiconductor including gallium nitride, silicon carbide, gallium arsenide, gallium phosphide, indium phosphide, indium arsenide, and/or indium antimonide, an alloy semiconductor including SiGe, GaAsP, AlInAs, AlGaAs, GaInAs, GaInP, and/or GaInAsP, or a combination thereof. In some embodiments, the substrate 102 may also be a semiconductor on insulator substrates, the semiconductor on insulator substrates may include a substrate, a buried oxide layer disposed on the substrate, and a semiconductor layer disposed on the buried oxide layer. In addition, the conductivity type of the substrate 102 may be N-type or P-type.

In some embodiments, the substrate 102 may include various isolation features (not shown) to define an active region and electronically isolate active elements in or on the substrate 102. In some embodiments, examples of the isolation features include shallow trench isolation (STI) features, local oxidation of silicon (LOCOS) features, other suitable isolation features, or combinations thereof. In some embodiments, for example, forming the isolation features may include forming an insulating layer on the substrate 102, selectively etching the insulating layer and the substrate 102 to form trenches in the substrate 102, growing a nitrogen-rich (e.g., silicon oxynitride) liner layer in the trenches, filling insulating materials (e.g., silicon dioxide, silicon nitride, or silicon oxynitride) in the trenches using a deposition process, performing an annealing process on the insulating materials in the trenches, and performing a planarization process such as a chemical mechanical polishing (CMP) process on the substrate 102 to remove excess insulating materials such that the insulating materials in the trenches are level with the top surface of the substrate 102.

In some embodiments, the substrate 102 may include various P-type doped regions and/or N-type doped regions which are formed by an ion implantation and/or a diffusion process. In some embodiments, the doped regions may be formed into transistors, photodiodes and so on. However, these elements are merely exemplary, and the present disclosure is not limited thereto.

In some embodiments, the substrate 102 may include various conductive features, such as a conductive line or a via (not shown). For example, the conductive features may be made of aluminum, copper, tungsten, other suitable conductive materials, an alloy thereof, or a combination thereof.

As shown in FIGS. 1A and 1B, in some embodiments, the optical sensor 100 is divided into a central region 104C and a first peripheral region 104P. As shown in the top view of FIG. 1B, the first peripheral region 104P surrounds the central region 104C.

As shown in FIGS. 1A and 1B, in some embodiments, the substrate 102 may include pixels 106. The pixels 106 may include a photodetector and readout circuitry. The photodetector may include a charged coupling device (CCD) sensor, a complimentary metal-oxide-semiconductor (CMOS) image sensor, an active sensor, a passive sensor, other suitable sensors, or a combination thereof. The readout circuitry may include a transfer transistor, a reset transistor, a source-follower transistor, a select transistor, one or more other suitable transistors, or a combination thereof. The pixels 106 may transform the received optical signals into electronic signals through a photodetector, and process the electronic signals through the readout circuitry. In such cases, a pixel 106 may correspond to at least one photodetector, such as at least one photodiode. As shown in FIG. 1B, the pixels 106 are arranged in an array from a top view and disposed in the central region 104C of the substrate 102. It should be noted that the number and arrangement of the pixel 106 array are merely an example, and the embodiments of the present disclosure are not limited thereto. The pixels 106 may be formed into an array with any number of rows and columns, or in any other arrangement.

Subsequently, as shown in FIGS. 2A and 2B, transparent pillars 108 and first dummy transparent pillars 108D are formed on the substrate 102. In some embodiments, a transparent layer may be blanketly formed on the substrate 102 first. In some embodiments, the transparent layer may include a transparent material, wherein the light transmittance of the transparent material to light with a wavelength in a range from 200 nm to 1200 nm is greater than 80%. The transparent material may include a light-curable material, a thermosetting material, or a combination thereof. In some embodiments, the transparent material may include polymethyl methacrylate (PMMA), perfluorocyclobutyl (PFCB), polymer, polyimide (PI), epoxy resins, other suitable materials, or a combination thereof. In some embodiments, the transparent material may be deposited on the substrate 102 through a process such as spin-coating, chemical vapor deposition (CVD), physical vapor deposition (PVD) (e.g. evaporation or sputtering), electro-plating, atomic layer deposition (ALD), other suitable processes, or a combination thereof.

Subsequently, the transparent material of the substrate 102 is selectively removed. In some embodiments, the transparent material is selectively removed by a patterning process and an etching process to form transparent pillars 108 correspondingly on the pixels 106 and to form first dummy transparent pillars 108D around the transparent pillars 108 in the first peripheral region 104P simultaneously. In some embodiments, the patterning process may include photoresist coating (e.g., spin-coating), soft baking, mask alignment, exposure, post-exposure baking, photoresist developing, rinsing and drying (e.g., hard baking), other suitable processes, or a combination thereof. The etching process may include such as a dry etching process (e.g., reactive ion etch (RIE), plasma etching, or ion milling), a wet etching process, other suitable processes, or a combination thereof.

Subsequently, as shown in FIGS. 3A and 3B, a light-shielding layer 110 is formed between the transparent pillars 108 and the first dummy transparent pillars 108D on the substrate 102. In some embodiments, the light-shielding layer 110 may include a light-shielding material, wherein the light absorptivity of the light-shielding material to light with a wavelength in a range from 200 nm to 1200 nm is greater than 80%. The light-shielding material may include a light-curable material, a thermosetting material, or a combination thereof. In some embodiments, the light-shielding material may include non-transparent photoresist, oil ink, molding compound, solder mask, other suitable materials, or a combination thereof. In some embodiments, the light-shielding material may be disposed between the transparent pillars 108 and the first dummy transparent pillars 108D on the substrate 102, and a curing process such as a light-curing process, a thermosetting process, or a combination thereof may be performed to cure the light-shielding material to form the light-shielding layer 110.

As shown in FIGS. 3A and 3B, a light collimating layer 112 of the optical sensor 100 includes the transparent pillars 108, the first dummy transparent pillars 108D, and the light-shielding layer 110. In some embodiments, other optical elements such as a color filter, a glass, a convexo-concave lens, and so on (not shown) may be included on the light collimating layer 112. The incident lights through the optical elements on the light collimating layer 112 pass though the light collimating layer 112 to irradiate the pixels 106. In such cases, the respective aspect ratio of the transparent pillars 108 and the first dummy transparent pillars 108D is in a range from 5 to 20. If the transparent pillars 108 and the first dummy transparent pillars 108D are too high, they are prone to deformation and collapse. If the transparent pillars 108 are too wide, the optical sensor 101 is prone to receiving unwanted incident lights and being difficult to achieve a good collimating performance. If the first dummy transparent pillars 108D are too wide, the loading effect may occur and reduce the production yield.

In some embodiments, as shown in FIG. 3B, the arrangement of the transparent pillars 108 is also an array, since the transparent pillars 108 are correspondingly disposed on the pixels 106. The transparent pillars 108 may cover the corresponding pixels 106 completely or partially. In this way, the transparent pillars 108 can protect the pixels 106 and prevent the pixels 106 from being covered with debris and/or contaminants during subsequent manufacturing. In some embodiments, as shown in FIG. 3B, the shape of each of the transparent pillars 108 is circular. In this way, the transparent pillars 108 cover a larger area than other patterns of equal diameter to increase the amount of light received by the pixels 106, and further protect the corresponding pixels 106.

In some embodiments, as shown in FIG. 3A, the first dummy transparent pillars 108D do not correspond to any pixel 106. Since the arrangement of the transparent pillars 108 is an array when viewed from a top view, the transparent pillars 108 at the edge of the array may be prone to deformation and collapse, due to the intermolecular cohesion force of the transparent material or the subsequent processes. By disposing the first dummy transparent pillars 108D at the edge of the array of transparent pillars 108 to serve as a stress buffer to provide physical support, the structure of the array of transparent pillars 108 may be strengthened to prevent the deformation and collapse of the transparent pillars 108 at the edge of the array. The uniformity of the transparent pillars 108 can be maintained and the production yield can be improved as a result.

In some embodiments, as shown in FIG. 3B, the shape of each of the first dummy transparent pillars 108D is oval. However, the present disclosure is not limited thereto. In other embodiments, the shape of the first dummy transparent pillars 108D may be a circle, oval, or rectangle of any size according to design and processing requirements.

In some embodiments, as shown in FIG. 3B, the width W of each transparent pillar 108 is smaller than the width DW of each first dummy transparent pillar 108D. In this way, the structure of the array of transparent pillars 108 can be strengthened further by the wider first dummy transparent pillars 108D. However, the present disclosure is not limited thereto. In other embodiments, the width W of each transparent pillar 108 may be greater than or the same as the width DW of each first dummy transparent pillar 108D. In such a case, the structure of the array of transparent pillars 108 can also be strengthened to prevent the transparent pillars 108 from deforming and collapsing. The uniformity of the transparent pillars 108 can be maintained and the production yield can be improved as a result.

In some embodiments, as shown in FIG. 3B, the pitch P of the transparent pillars 108 is the same as the pitch DP of the first dummy transparent pillars 108D. In this way, the first dummy transparent pillars 108D can be prevented from being too close to each other, which can cause them to collapse and become deformed. However, the present disclosure is not limited thereto. In other embodiments, if the process capability permits, the pitch DP of the first dummy transparent pillars 108D can be smaller than the pitch P of the transparent pillars 108. In this way, the structure of the array of transparent pillars 108 can be strengthened by the denser first dummy transparent pillars 108D. Alternatively, in other embodiments, to prevent the first dummy transparent pillars 108D from being too close to each other, which can cause them to collapse and become deformed, the pitch DP of the first dummy transparent pillars 108D may be greater than the pitch P of the transparent pillars 108.

In some embodiments, if the area of the transparent pillars 108 and the first dummy transparent pillars 108D is too large, the peripheral elements of the light collimating layer 112 may be impacted. If the area of the transparent pillars 108 and the first dummy transparent pillars 108D is too small, the area for sensing fingerprints is too small to sense fingerprints effectively.

In the embodiments above, the transparent pillars 108 and the first dummy transparent pillars 108D may be formed by the same manufacturing process simultaneously and formed of the same material. In such cases, the cycle time and cost of the manufacturing process can be reduced. However, the present disclosure is not limited thereto. In other embodiments, the materials of the transparent pillars 108 and the first dummy transparent pillars 108D may be different. For example, after forming the transparent pillars 108 on the pixels 106 and forming the light-shielding layer 110 between the transparent pillars 108, a patterning process can be used to form openings in the light-shielding layer 110 in the first peripheral region 104P around the transparent pillars 108. The openings are filled with a transparent material which is different from that of the transparent pillars 108 to form the first dummy transparent pillars 108D. Subsequently, a planarization process such as a chemical mechanical polishing (CMP) process may be performed on the transparent pillars 108, the first dummy transparent pillars 108D, and the light-shielding layer 110 to remove the excess transparent materials. By the different material of the first dummy transparent pillars 108D, the structure of the array of transparent pillars 108 can be strengthened further to prevent the transparent pillars 108 at the edge of the array from deformation and collapse. The uniformity of the transparent pillars 108 can be maintained and the production yield can be improved as a result.

As described above, disposing dummy transparent pillars, which do not correspond to pixels, around the transparent pillar array of the light collimating layer of the optical sensor can strengthen the structure of the transparent pillar array to prevent the array from deforming and collapsing. The uniformity of the transparent pillars can be maintained and the production yield can be improved as a result.

Figure 4:
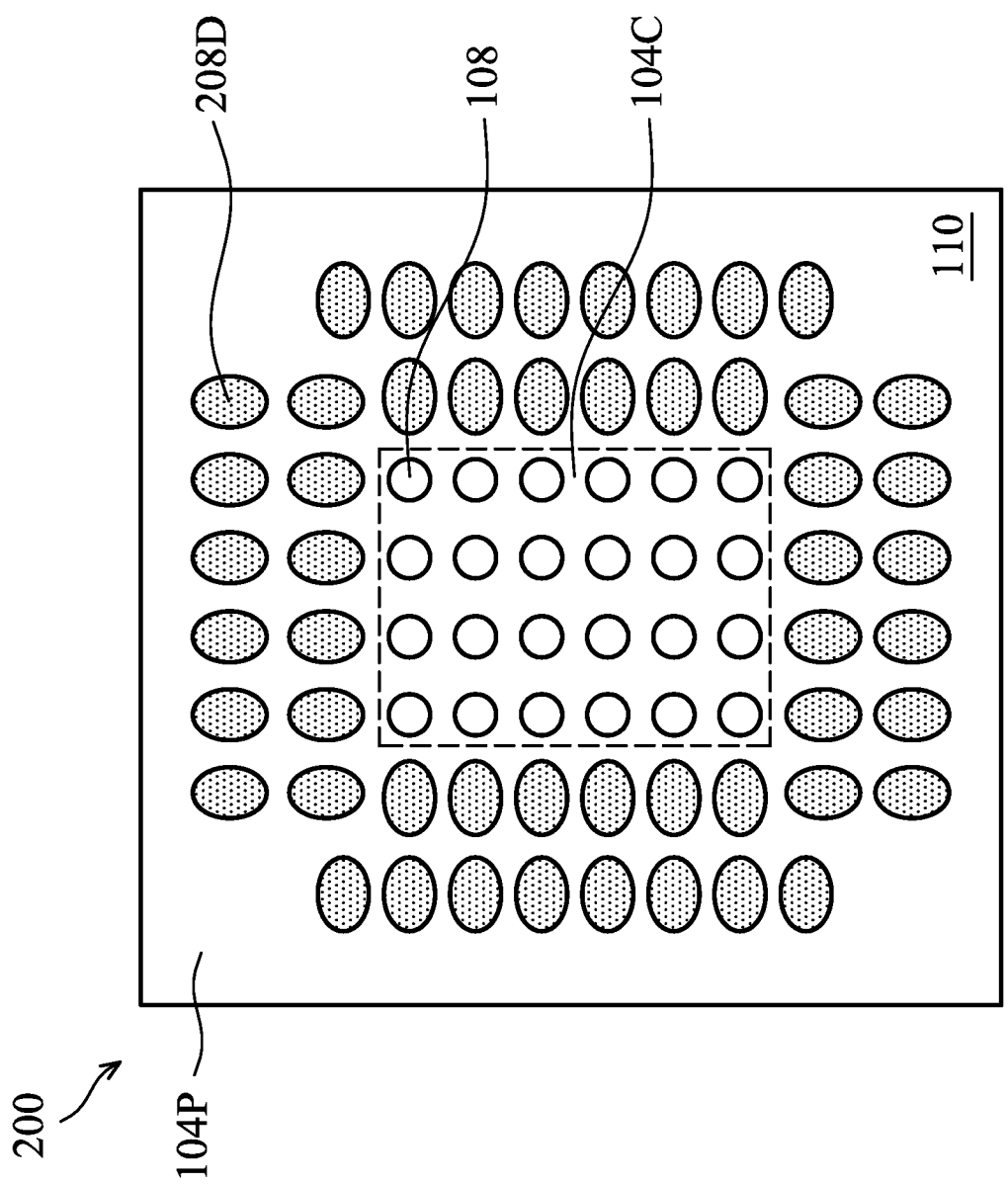
FIG. 4 is a top view illustrating an optical sensor, according to other embodiments of the present disclosure.

FIG. 4 is a top view illustrating an optical sensor, according to other embodiments of the present disclosure. The same or similar manufacturing processes or elements as those of the foregoing embodiments will be given the same reference numerals, and the details thereof will not be described again. The difference between the embodiments of FIG. 4 and the foregoing embodiments is that, as shown in FIG. 4, the optical sensor 200 includes multiple layers of first dummy transparent pillars 208D in the first peripheral region 104P.

In some embodiments, the different layers of the first dummy transparent pillars 208D has the same material, and the different layers of the first dummy transparent pillars 208D and the transparent pillars 108 are formed simultaneously. In other embodiments, the different layers of the first dummy transparent pillars 208D are formed of different materials. The different layers of the first dummy transparent pillars 208D with different materials are formed by several patterning processes after the forming of the light-shielding layer.

As shown in the embodiments in FIG. 4, the forming of the multiple layers of first dummy transparent pillars is used to strengthen the structure of the transparent pillar array to prevent the array from deforming and collapsing. The uniformity of the transparent pillars can be maintained and the production yield can be improved as a result.

It should be noted that the number of layers of the dummy transparent pillars illustrated in FIG. 4 is merely an example, and the present disclosure is not limited thereto. In the embodiments of the present disclosure, depending on the process and design requirements, more than three layers of dummy transparent pillars may also be included.

Figure 5:
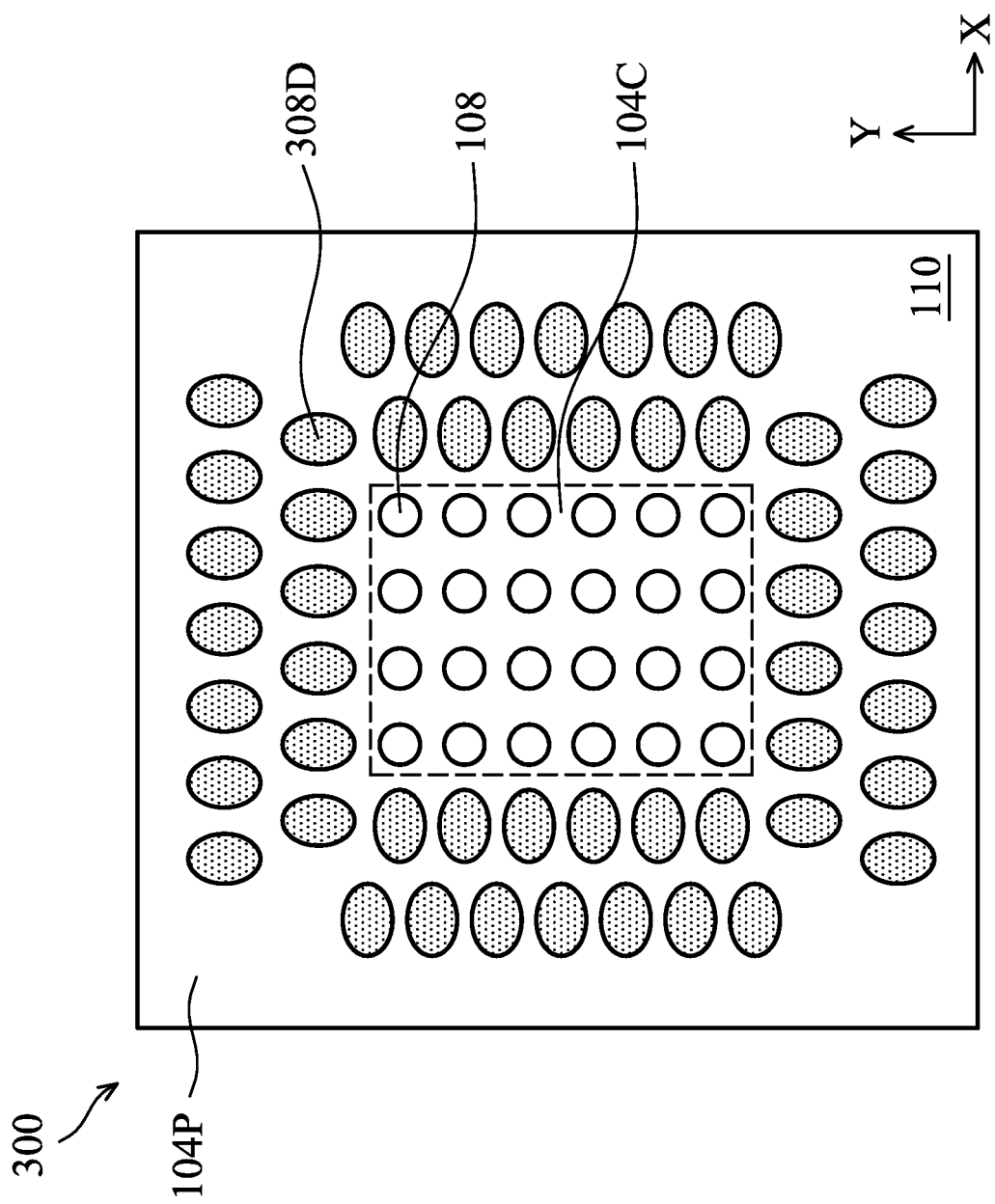
FIG. 5 is a top view illustrating an optical sensor, according to some embodiments of the present disclosure.

FIG. 5 is a top view illustrating an optical sensor 300, according to some embodiments of the present disclosure. The same or similar manufacturing processes or elements as those of the foregoing embodiments will be given the same reference numerals, and the details thereof will not be described again. The difference between the embodiments of FIG. 5 and the embodiments in FIG. 4 is that, as shown in FIG. 5, the optical sensor 300 includes multiple layers of first dummy transparent pillars 308D staggered with each other in the first peripheral region 104P around the transparent pillars 108. The phrase "staggered with each other" herein means that the first dummy transparent pillars 308D in the neighboring two layers are not aligned in the X and the Y directions.

As shown in the embodiments in FIG. 5, the forming of the multiple layers of first dummy transparent pillars staggered with each other is used to strengthen the structure of the transparent pillar array to prevent the array from deforming and collapsing. The uniformity of the transparent pillars can be maintained and the production yield can be improved as a result.

Figure 6:
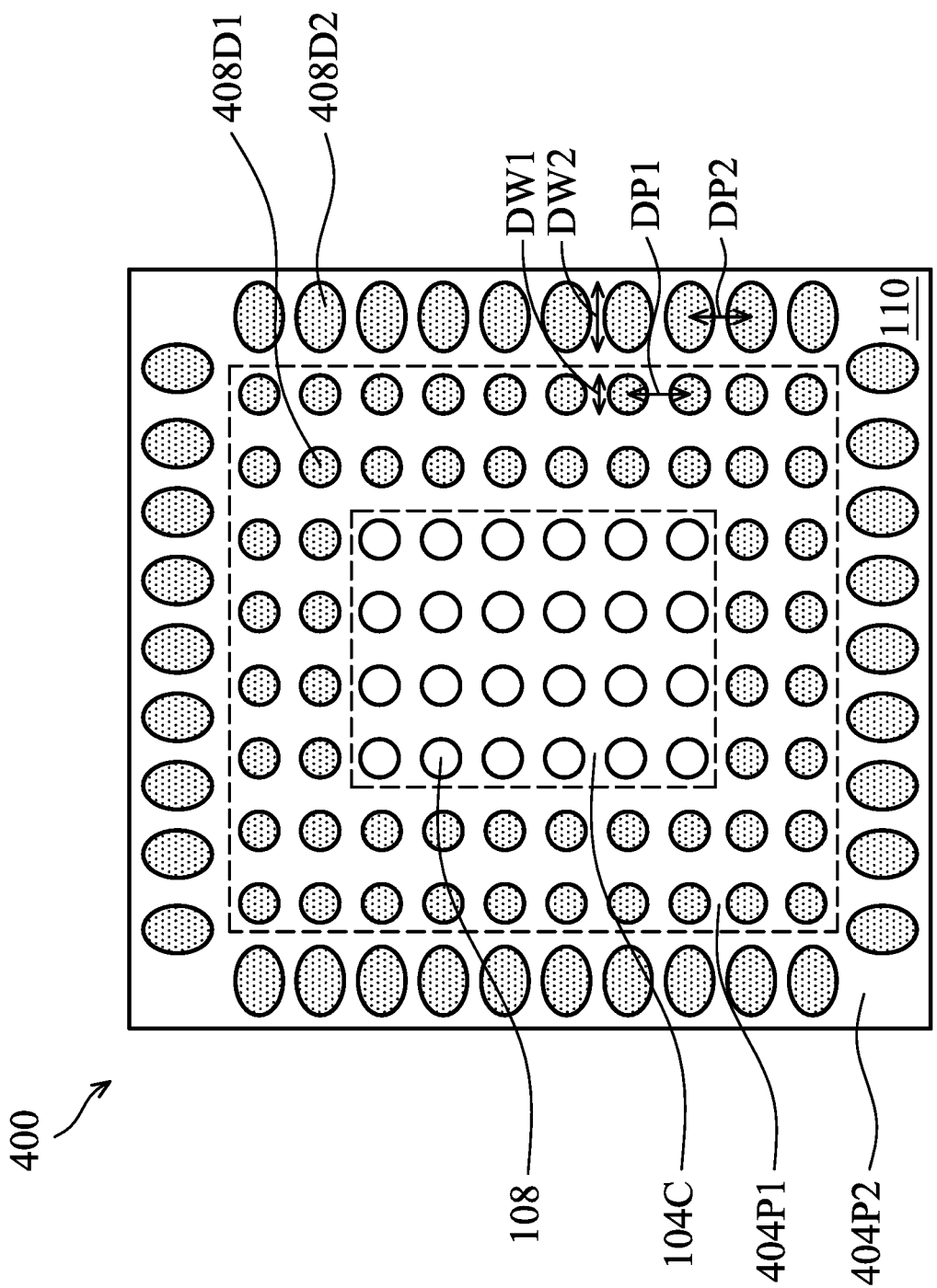
FIG. 6 is a top view illustrating an optical sensor, according to other embodiments of the present disclosure.

FIG. 6 is a top view illustrating an optical sensor, according to other embodiments of the present disclosure. The same or similar manufacturing processes or elements as those of the foregoing embodiments will be given the same reference numerals, and the details thereof will not be described again. The difference between the embodiments of FIG. 6 and the foregoing embodiment is that, as shown in FIG. 6, the optical sensor 400 not only includes multiple layers of first dummy transparent pillars 408D1 in the first peripheral region 404P1 around the transparent pillars 108, but also includes multiple layers of second dummy transparent pillars 408D2 in the second peripheral region 404P2 around the first dummy transparent pillars 408D1. In some embodiments, at least one of the shape, size, pitch, and arrangement of the dummy transparent pillars is different in the different peripheral regions. For example, the shape, size, pitch, and arrangement of the first dummy transparent pillars 408D1 in the first peripheral region 404P1 are different from those of the second dummy transparent pillars 408D2 in the second peripheral region 404P2.

In some embodiments, as shown in FIG. 6, the shape of the first dummy transparent pillars 408D1 is circular from a top view, and the shape of the second dummy transparent pillars 408D2 is oval from a top view. However, the present disclosure is not limited thereto. In other embodiments, the shape of each of the first dummy transparent pillars 408D1 and second dummy transparent pillars 408D2 may be a circle, oval, or rectangle of any size from a top view. In some embodiments, the shape of each of the first dummy transparent pillars 408D1 and second dummy transparent pillars 408D2 may be the same from a top view. In other embodiments, the shape of each of the first dummy transparent pillars 408D1 and second dummy transparent pillars 408D2 may be different. The shape of each of the dummy transparent pillars 408D1 and 408D2 may vary depending on design and processing requirements.

In some embodiments, as shown in FIG. 6, the width DW1 of each first dummy transparent pillar 408D1 is smaller than the width DW2 of each second dummy transparent pillar 408D2. In this way, the structure of the array of transparent pillars 108 can be strengthened by the wider second dummy transparent pillars 408D2. However, the present disclosure is not limited thereto. In other embodiments, the width DW1 of each first dummy transparent pillar 408D1 may be greater than or the same as the width DW2 of each second dummy transparent pillar 408D2. In such a case, the structure of the array of transparent pillars 108 can be strengthened to prevent the transparent pillars 108 at the edge of the array from deforming and collapsing. The uniformity of the transparent pillars 108 can be maintained and the production yield can be improved as a result.

In some embodiments, as shown in FIG. 6, the pitch DP1 of the first dummy transparent pillars 408D1 is the same as the pitch DP2 of the second dummy transparent pillars 408D2. In this way, the second dummy transparent pillars 408D2 can be prevented from being too close to each other, which can cause them to collapse and become deformed. However, the present disclosure is not limited thereto. In other embodiments, if the process capability permits, the pitch DP2 of the second dummy transparent pillars 408D2 can be smaller than the pitch DP1 of the first dummy transparent pillars 408D1. In this way, the structure of the array of transparent pillars 108 can be strengthened by the denser second dummy transparent pillars 408D2. Alternatively, to prevent the second dummy transparent pillars 408D2 from being too close to each other, which can cause them to collapse and become deformed, the pitch DP2 of the second dummy transparent pillars 408D2 may be greater than the pitch DP1 of the first dummy transparent pillars 408D1.

In some embodiments, the transparent pillars 108, the first dummy transparent pillars 408D1, and the second dummy transparent pillars 408D2 may be formed by the same manufacturing process simultaneously and formed of the same material. In such cases, the cycle time and cost of the manufacturing process can be reduced. However, the present disclosure is not limited thereto. In other embodiments, the materials of the transparent pillars 108, the first dummy transparent pillars 408D1, and the second dummy transparent pillars 408D2 may be different than each other. For example, after forming the transparent pillars 108 on the pixels 106 and forming the light-shielding layer 110 between the transparent pillars 108, a patterning process can be used to form openings in the light-shielding layer 110 in the first peripheral region 404P1 around the transparent pillars 108. The openings are filled with a transparent material which is different from that of the transparent pillars 108 to form the first dummy transparent pillars 408D1. Subsequently, a planarization process such as a chemical mechanical polishing (CMP) process may be performed on the transparent pillars 108, the first dummy transparent pillars 408D1, and the light-shielding layer 110 to remove the excess transparent materials. Subsequently, a patterning process can be used again to form openings in the light-shielding layer 110 in the second peripheral region 404P2 around the first dummy transparent pillars 408D1. The openings are filled with a transparent material which is different from that of the first dummy transparent pillars 408D1 to form the second dummy transparent pillars 408D2. Subsequently, a planarization process such as a chemical mechanical polishing (CMP) process may be performed on the transparent pillars 108, the first dummy transparent pillars 408D1, the second dummy transparent pillars 408D2, and the light-shielding layer 110 to remove the excess transparent materials.

By the different materials of the first dummy transparent pillars 408D1 and the second dummy transparent pillars 408D2, the structure of the array of transparent pillars 108 can be strengthened further to prevent the transparent pillars 108 at the edge of the array from deformation and collapse. The uniformity of the transparent pillars 108 can be maintained and the production yield can be improved as a result.

In some embodiments, the first dummy transparent pillars 408D1 and the second dummy transparent pillars 408D2 may be arranged into a single layer or multiple layers. In some embodiments, the total number of layers of the first dummy transparent pillars 408D1 and the second dummy transparent pillars 408D2 is in a range from 3 to 5 layers. Depending on process and design requirements, the first dummy transparent pillars 408D1 and the second dummy transparent pillars 408D2 may be aligned or staggered with each other.

By using the same or different shapes, widths, pitches, materials, or arrangements for the first dummy transparent pillars and the second dummy transparent pillars around the transparent pillar array, the structure of the transparent pillar array can be strengthened further to prevent the transparent pillars at the edge of the array from deforming and collapsing. The uniformity of the transparent pillars can be maintained and the production yield can be improved as a result.

Figure 7:
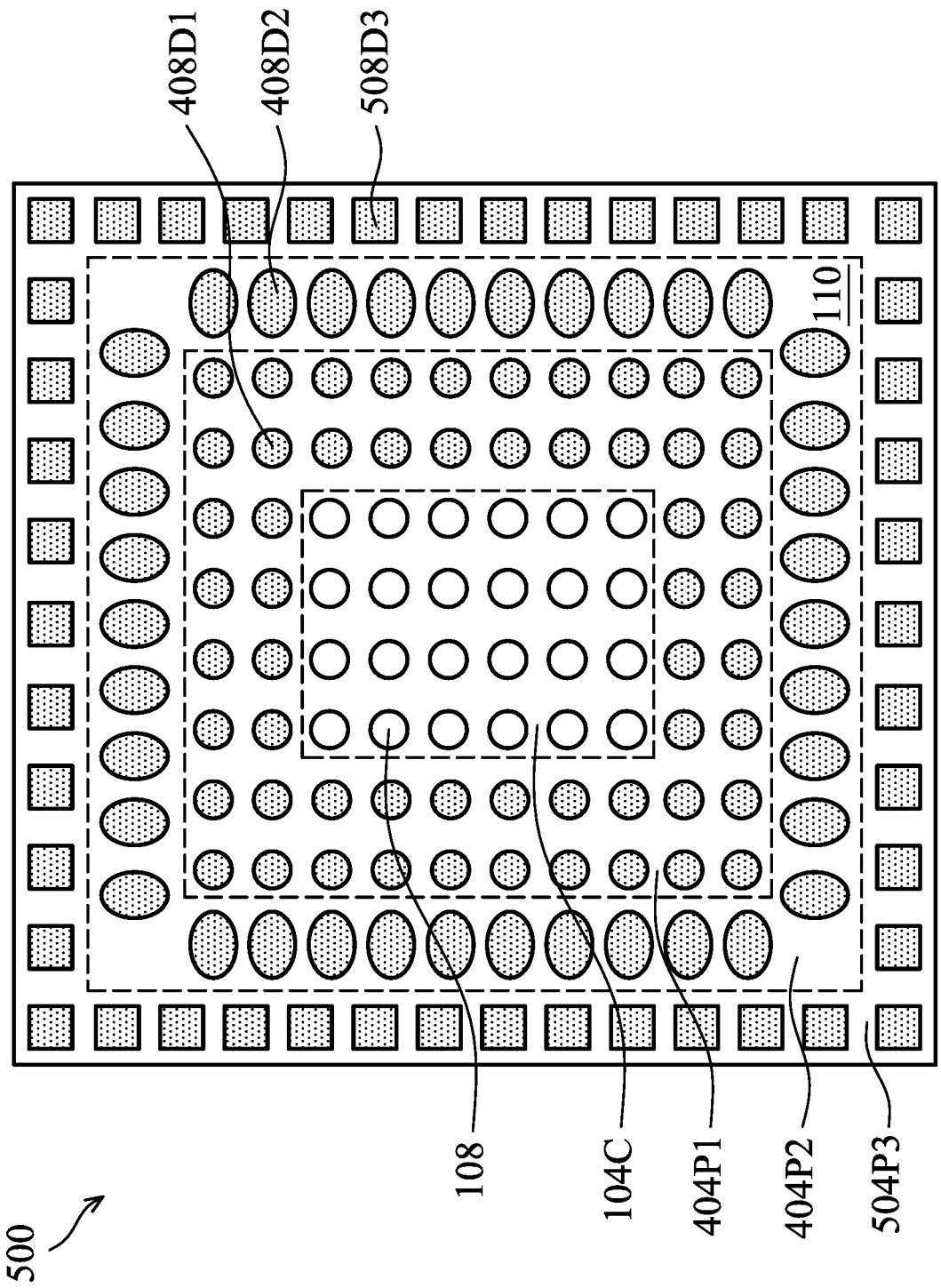
FIG. 7 is a top view illustrating an optical sensor, according to other embodiments of the present disclosure.

It should be noted that the number of peripheral regions illustrated in FIG. 6 is merely an example, and the present disclosure is not limited thereto. For example, in other embodiment of the present disclosure shown in FIG. 7, the optical sensor 500 includes the first peripheral region 404P1, the second peripheral region 404P2, and the third peripheral region 504P3. The first dummy transparent pillars 408D1, the second dummy transparent pillars 408D2, and the third dummy transparent pillars 508D3 are formed around the transparent pillar array, wherein the shape of each of the first dummy transparent pillars 408D1, second dummy transparent pillars 408D2, and third dummy transparent pillars 508D3 may be different (e.g. circular, oval, or rectangular) or the same, depending on process and design requirements.

By forming more than three layers of dummy transparent pillars with the same or different shapes, widths, pitches, materials, layers, or arrangements around the transparent pillars, the structure of transparent pillar array can be strengthened further to prevent the transparent pillars at the edge of the array from deforming and collapsing. The uniformity of the transparent pillars can be maintained and the production yield can be improved as a result.

In summary, the embodiments of the present disclosure provide an optical sensor. In the light-shielding layer of the light collimating layer in the optical sensor, in addition to forming the transparent pillars on the corresponding pixels, dummy transparent pillars are formed around the transparent pillar array. The geometric shapes, sizes, arrangements, and materials may be adjusted according to processing requirements. In such cases, the structure of the transparent pillar array can be strengthened according to process and design requirements to prevent the transparent pillars at the edge of the array from deformation and collapse. The uniformity of the transparent pillars can be maintained and the production yield can be improved as a result.

It should be noted that although the advantages and effects of some embodiments of the present disclosure have been described above, not all embodiments are required to achieve all of the advantages and benefits.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. An optical sensor, comprising:
a plurality of pixels disposed in a substrate;
a light collimating layer disposed on the substrate, wherein the light collimating layer comprises:
a light-shielding layer disposed on the substrate;
a plurality of transparent pillars through the light-shielding layer disposed correspondingly on the plurality of pixels; and
a plurality of first dummy transparent pillars through the light-shielding layer disposed on a first peripheral region of the light collimating layer,
wherein the plurality of first dummy transparent pillars surround the plurality of transparent pillars from a top view.
2. The optical sensor as claimed in claim 1, wherein none of the plurality of first dummy transparent pillars corresponds to any one of the pixels.

3. The optical sensor as claimed in claim 1, wherein each of the plurality of transparent pillars is circular from a top view.

4. The optical sensor as claimed in claim 1, wherein each of the plurality of first dummy transparent pillars is circular, oval, or rectangular from a top view.

5. The optical sensor as claimed in claim 1, wherein a width of each of the plurality of first dummy transparent pillars is the same as a width of each of the plurality of transparent pillars.

6. The optical sensor as claimed in claim 1, wherein a width of each of the plurality of first dummy transparent pillars is different than a width of each of the plurality of transparent pillars.

7. The optical sensor as claimed in claim 1, wherein an arrangement of the plurality of transparent pillars is an array from a top view.

8. The optical sensor as claimed in claim 1, wherein an arrangement of the plurality of first dummy transparent pillars is a multi-layered arrangement from a top view.

9. The optical sensor as claimed in claim 8, wherein the plurality of first dummy transparent pillars are staggered with each other from a top view.

10. The optical sensor as claimed in claim 1, wherein an aspect ratio of the plurality of first dummy transparent pillars and the plurality of transparent pillars is in a range from 5:1 to 20:1.

11. The optical sensor as claimed in claim 1, wherein the light collimating layer further comprises:
a plurality of second dummy transparent pillars through the light-shielding layer disposed on a second peripheral region of the light collimating layer, wherein the second peripheral region surrounds the first peripheral region;
wherein the plurality of second dummy transparent pillars surround the plurality of first dummy transparent pillars from a top view.

12. The optical sensor as claimed in claim 11, wherein a width of each of the plurality of second dummy transparent pillars is different than a width of each of the plurality of first dummy transparent pillars.

13. The optical sensor as claimed in claim 11, wherein a width of each of the plurality of second dummy transparent pillars is the same as a width of each of the plurality of first dummy transparent pillars.

14. The optical sensor as claimed in claim 11, wherein each of the plurality of second dummy transparent pillars is circular, oval, or rectangular from a top view.

15. A method for forming an optical sensor, comprising:
forming a plurality of pixels in a substrate; and
forming a light collimating layer on the substrate, wherein steps for forming the light collimating layer comprise:
forming a plurality of transparent pillars and a plurality of first dummy transparent pillars on the substrate, wherein the plurality of transparent pillars are disposed correspondingly on the plurality of pixels and the plurality of first dummy transparent pillars are disposed on a first peripheral region of the light collimating layer; and
forming a light-shielding layer between the plurality of transparent pillars and the plurality of first dummy transparent pillars,
wherein the plurality of first dummy transparent pillars surround the plurality of transparent pillars from a top view.

16. The method as claimed in claim 15, wherein none of the plurality of first dummy transparent pillars corresponds to any one of the pixels.

17. The method as claimed in claim 15, wherein an arrangement of the plurality of first dummy transparent pillars is a multi-layered arrangement from a top view.

18. The method as claimed in claim 17, wherein the plurality of first dummy transparent pillars are staggered with each other from a top view.

19. The method as claimed in claim 15, wherein the light collimating layer further comprises:
a plurality of second dummy transparent pillars through the light-shielding layer disposed on a second peripheral region of the light collimating layer, wherein the second peripheral region surrounds the first peripheral region;
wherein the plurality of second dummy transparent pillars surround the plurality of first dummy transparent pillars from a top view.

* * * * *